3,082,152
ADDUCTS OF ALUMINUM MONOHYDROXY DI-ACETYLSALICYLATE AND ETHYL ACETOACETATE AND PREPARATION THEREOF
Robert W. Lerner, Adrian, Mich., assignor to Stauffer Chemical Company, New York, N.Y., a corporation of Delaware
No Drawing. Filed Apr. 28, 1960, Ser. No. 25,201
3 Claims. (Cl. 167—65)

The present invention is concerned with the novel compound which is the adduct of one molecule of ethyl acetoacetate with two molecules of aluminum monohydroxy diacetylsalicylate, and with the novel process for preparing this compound.

Aluminum monohydroxy diacetylsalicylate has recently been used for the same purposes as acetylsalicylic acid. The aluminum compound possesses certain advantages over acetylsalicylic acid, especially freedom from gastric side effects. At the same time, however, it has certain disadvantages which have hindered its use commercially, particularly a tendency toward decomposition upon storing.

The present invention has the advantage of overcoming the tendency of aluminum monohydroxy diacetylsalicylate to decompose. According to the present invention there is obtained a novel compound which, when taken internally, produces physiological results similar to those obtained with aluminum monohydroxy diacetylsalicylate. The novel compound, however, has greater resistance to decomposition than aluminum monohydroxy diacetylsalicylate or adducts thereof with other esters. Furthermore, the compound of the present invention gives faster relief from pain than adducts with other esters and more prolonged relief than acetylsalicylic acid. The novel compound of the present invention is a free flowing powder which can be processed into tablets by the use of conventional tablet making machinery.

The novel compound of the present invention is the adduct formed between one molecule of ethyl acetoacetate and two molecules of aluminum monohydroxy diacetylsalicylate. It should be emphasized that the compound is a definite chemical composition, and is not a mere mixture. It is a discrete compound in which the ester is chemically bonded (probably by some type of chelated formation) to the aluminum monohydroxy diacetylsalicylate. The exact nature of the chemical bonds is not fully understood, but there is conclusive evidence that the bonds exist. In particular, cryoscopic molecular weight determination using biphenyl as the solvent proves that the novel compound of the present invention is a discrete chemical entity having a molecular weight (within the range of experimental error) corresponding to the formula for two molecules of aluminum monohydroxy diacetylsalicylate bonded to one molecule of ethyl acetoacetate.

According to the process of the present invention an aluminum alkoxide (preferably aluminum isopropoxide) is reacted with ethyl acetoacetate, preferably in a 1 to 1 mole ratio. The temperature of the reaction is preferably slightly above the melting point of the aluminum alkoxide. A mole of alcohol formed from the alkoxide groups of the aluminum alkoxide is distilled from the reaction mixture under vacuum. The residual liquid is diluted with a solvent such as isopropanol, and the solution is reacted with two moles acetylsalicylic acid, preferably in a slurry with a solvent such as isopropanol. The reaction takes place at room temperature and a clear solution is formed. A mole of water is then added to the reaction mixture, and a precipitate of the final product forms. The precipitate is separated by filtration. The compound of the present invention is administered in the same manner as acetylsalicylic acid. The common dosage of acetylsalicylic acid varies from about 1 grain for children to about 5 to 15 grains in the case of adults. The compound of the present invention should be administered in a dosage containing approximately the stoichiometric equivalent of such an amount of acetylsalicylic acid. 1.3 grains of the compound of the present invention corresponds stoichiometrically to one grain of acetylsalicylic acid.

The following example is given solely for the purpose of illustration and is not to be construed as a limitation of the present invention, many variations of which occur to those skilled in the art without departing from the spirit or scope of the invention.

Example 1

Combine aluminum isopropoxide (372.5 grams) and ethyl acetoacetate (237.3 grams) in a one liter, round bottom flask fitted with vacuum, stirrer, pot thermometer, and Dean Stark liquid collector. Warm the mixture to melt under vacuum (15 inches). Stir and collect the distilled isopropanol until the theoretical amount of alcohol distills over (theory=108 grams). Distillation begins at a pot temperature of 88° C. and is finished when the pot temperature reaches 135° C.

Add acetylsalicylic acid (360 grams) to isopropanol (900 ml.) contained in a 5-liter, 3-necked flask fitted with stirrer, pot thermometer, condenser, and addition funnel. Adjust the reactor contents to 20–22° C. and stir for 15 minutes.

Add the aluminum diisopropoxide-mono-ethyl acetoacetate chelate (137 grams) produced as described in the first paragraph above to isopropanol (325 ml.) and mix to dissolve. Add the resulting solution of aluminum diisopropoxide-mono-ethyl acetoacetate chelate to the slurry of acetylsalicylic acid in isopropanol over a 1-minute period keeping the pot temperature less than 28° C. After the addition is completed stir the reactor contents for two minutes. Rapidly add water (18 grams) to the stirred reactor contents keeping the temperature at 28° C. Continue stirring the reactor contents at 28° C. for seven minutes and allow the solid to settle for one hour. Decant the clear liquid and filter off the solid material. The yield is oven-dried at less than 45° C. and gives 179.9 grams (71%) aluminum monohydroxy diacetylsalicylate ethyl acetoacetate chelate.

What is claimed is:

1. The adduct of one molecule of ethyl acetoacetate with two molecules of aluminum monohydroxy diacetylsalicylate.

2. A unitary dosage form suitable for oral administration and comprising from about 1 to about 15 grains of the adduct of one molecule of ethyl acetoacetate with two molecules of aluminum monohydroxy diacetylsalicylate.

3. A process for the preparation of the adduct of one molecule of ethyl acetoacetate with two molecules of aluminum monohydroxy diacetylsalicylate, said process comprising: (a) reacting an aluminum alkoxide with ethyl acetoacetate, (b) reacting the product of reaction (a) with acetylsalicylic acid, and (c) reacting the product of reaction (b) with water.

References Cited in the file of this patent
UNITED STATES PATENTS

| | | |
|---|---|---|
| 2,427,887 | Wallace | Sept. 23, 1947 |
| 2,471,394 | Gubner | May 24, 1949 |
| 2,959,606 | Mitra et al. | Nov. 8, 1960 |
| 2,965,662 | Moser | Dec. 20, 1960 |